Oct. 30, 1951     T. E. NELSON     2,573,591
OIL SEAL
Filed June 28, 1946
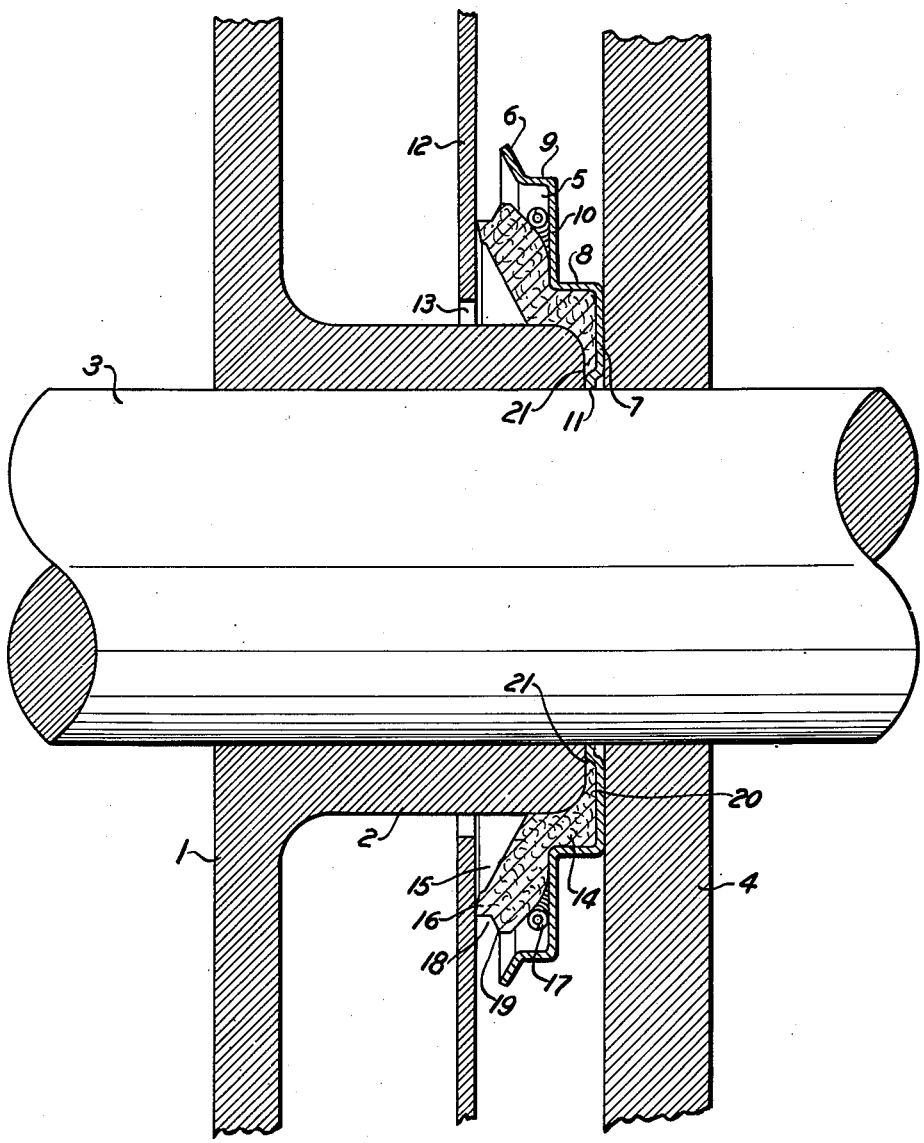
INVENTOR.
THOMAS EDWARD NELSON.
BY
ATTORNEY.

Patented Oct. 30, 1951

2,573,591

UNITED STATES PATENT OFFICE 2,573,591

OIL SEAL

Thomas Edward Nelson, Pontiac, Mich.

Application June 28, 1946, Serial No. 680,177

1 Claim. (Cl. 286—11)

This invention relates to oil seals the purpose of which provides a new and improved form of sealing ring for the prevention of leakage of oil from the gear case as for instance the crank case of an automobile engine or other apparatus in which shaft packing is usable.

These and other structural features and relationship of parts are hereinafter more fully described and claimed and an oil seal embodying my invention is shown in the accompanying drawing which is a section showing the device as used in conjunction with a gear case.

Drive pulley 1 has a hub 2 through which the shaft 3 projects. On the shaft is secured a timing gear 4 which is spaced from the hub 2 and a cup 5 is formed at its outer end with an outwardly inclined flange 6. The base 7 of the cup is apertured to permit the same to be positioned on the shaft and is offset as indicated at 8 and a further offset portion at 9 is connected with the portion 8 by a flange 10. The base 7 has an inturned edge portion 11 abutting the end of the hub 2 and the gear 4 is in pressure contact with the base 7 of the cup. The gear case has a portion 12 apertured at 13 to receive the hub 2 of the drive pulley which is to be understood as being keyed to the shaft.

The sealing element 14 is cylindrical or cup shaped in form and has an angularly disposed flange 15 terminating in an inclined edge portion 16 in contact with the portion 12 of the gear case and a garter spring 17 engages the outer face of the flange 15 thereby holding the edge 16 of the sealing element in pressure contact with the gear case cover 12. The sealing ring is centrally apertured and the inner edge is maintained in pressure contact with the end of the hub 2 of the drive pulley.

The peripheral edge of the sealing ring is V-shaped in cross section as indicated at 18 and as the edge 16 becomes worn the garter spring will eventually force the outer pointed edge 19 to contact with the outer face of the gear case 12. Thus, as said end edge 16 wears it is constantly kept in contact with the gear case cover and leakage of oil along the shaft to the exterior of the casing is prevented. The inner edge 20 of the sealing ring is held under pressure between the timing gear and the end 21 of the hub 2. Therefore oil from the crank case cannot pass along the outer surface of the hub 2 of the timing gear and thence along the shaft in either direction to the exterior of the casing.

It is believed evident from the foregoing description that the sealing ring as herein described is comparatively simple and inexpensive in construction and is of long life, due to the provision of several sharp edges at the peripheral of sealing ring.

Having thus briefly described my invention, its utility and mode of operation, what I claim and desire to secure by Letters Patent of the United States is:

An oil seal for positioning on a rotary shaft projecting through the cover of a gear case, a drive member secured on the shaft with its hub loosely projecting through said cover, a cup-like centrally apertured annular retainer secured upon said shaft, said retainer having a central hub bearing against said first hub, an outwardly extending radial plate joined to said central hub terminating in an axial outwardly projected flange, the latter terminating in a second outwardly extending radial plate having a second outwardly projected axial flange, an annular sealing element with its peripheral inner portion wedged between said first hub and said first radial plate, and having an outer peripheral wedge shaped portion projecting axially towards and bearing against the inner surface of said cover, a garter spring within said retainer bearing against the outer peripheral portion of said sealing element urging the same into contact with said cover, and a second member fixed on said shaft compressively engaging said first radial plate.

THOMAS EDWARD NELSON.

REFERENCES CITED

The following references are of record in the file of this patent:

UNITED STATES PATENTS

| Number | Name | Date |
|---|---|---|
| 1,061,657 | Bondy | May 13, 1913 |
| 1,538,416 | Trautner | May 19, 1925 |
| 2,076,747 | Salisbury | Apr. 13, 1937 |
| 2,080,669 | Nelson | May 18, 1937 |
| 2,224,449 | Schmied | Dec. 10, 1940 |
| 2,243,227 | Stratton | May 27, 1941 |
| 2,264,062 | Wilder | Nov. 25, 1941 |
| 2,395,953 | Berten | Mar. 5, 1946 |

FOREIGN PATENTS

| Number | Country | Date |
|---|---|---|
| 877,041 | France | 1942 |